July 4, 1950     R. L. SMITH     2,513,593
COFFEE MAKER
Filed Jan. 10, 1946
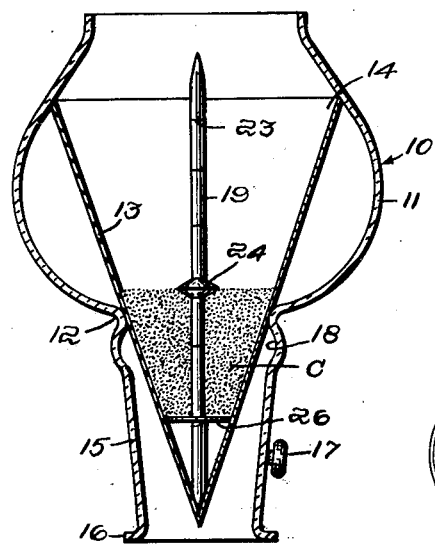
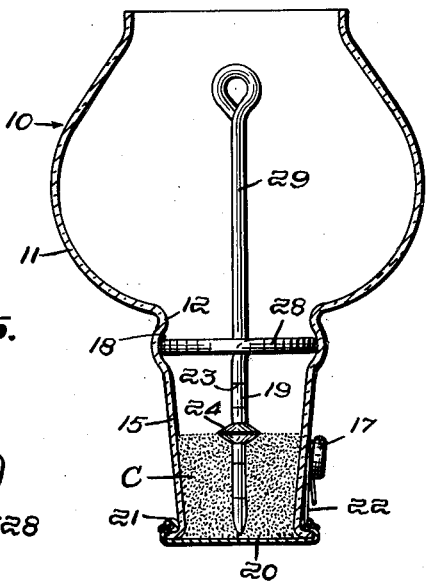
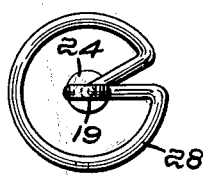
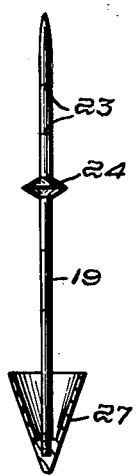
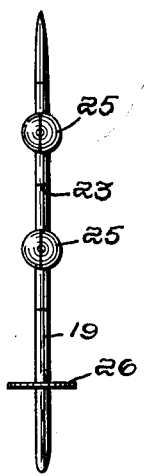
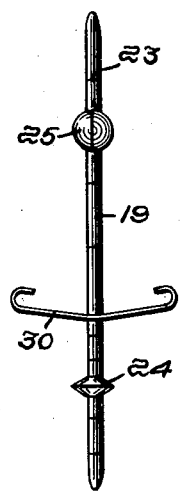
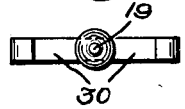
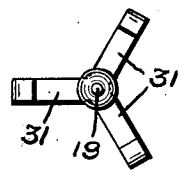
Inventor:
Roland L. Smith,
by Geo. B. Rawlings
Attorney Patented July 4, 1950

2,513,593

UNITED STATES PATENT OFFICE 2,513,593

COFFEE MAKER

Roland L. Smith, Belmont, Mass., assignor to Nuproducts Corporation, Cambridge, Mass., a corporation of Massachusetts Application January 10, 1946, Serial No. 640,181

5 Claims. (Cl. 99—285)

This invention relates to coffee making machines of the type in which an upper and a lower vessel are telescopically assembled to one another, and has for its main object to provide a measuring unit to be placed in an upright position within the upper vessel of the machine whereby the proper quantity of ground coffee needed to make a predetermined number of cups of liquid coffee may be measured directly into said vessel without the necessity of using a separate measuring cup or spoon.

Other objects and advantages will appear as this description proceeds.

My measuring units may be used with coffee making machines of either the "vacuum" or the "drip" type. For either type, my measuring unit consists of a rod having a series of longitudinally spaced graduations and an adjustable indicator slidable axially along said rod relative to said graduations. When the measuring rod and its indicator are placed in an upright position substantially centrally of the upper vessel of the machine, the graduations and the position of the indicator with respect thereto are visible from any side of the vessel. By adjusting the indicator along the rod until opposite a selected graduation, the proper quantity of ground coffee to be poured into the vessel to make the required number of cups of liquid coffee is accurately shown.

In the accompanying drawing wherein I have illustrated several practical embodiments of my invention:

Figure 1 shows, in partial vertical section, an assembly consisting of upper vessel, filter unit, and measuring unit used when making "drip" coffee.

Figures 2 and 3 show, in detached elevation, alternate forms of measuring units which may be substituted for that shown in Figure 1 when making "drip" coffee.

Figure 4 shows, in partial vertical section, an assembly consisting of upper vessel, filter unit and measuring unit, as used when making "vacuum" coffee.

Figure 5 is a plan view of the measuring unit shown in Figure 4.

Figure 6 shows, in detached elevation, an alternate form of measuring unit which may be substituted for that shown in Figure 4 when making "vacuum" coffee.

Figure 7 is a plan view of Figure 6, and

Figure 8 is a plan view of still another form of measuring unit which may be substituted for either of those shown in Figures 4 or 6 when making "vacuum" coffee.

I have indicated generally at 10 in Figures 1 and 4 an upper infusion vessel of glass or other transparent heat-resisting material which is to be telescopically assembled to the conventional lower water-heating vessel (not shown) of a coffee making machine and used for making "drip" or "vacuum" coffee.

Vessel 10 comprises a bowl portion 11 having an open upper end through which the ground coffee C is adapted to be introduced. Bowl 11 is shaped to provide at its bottom an annular shoulder 12 which, where "drip" coffee is being made, functions as a support for an internal conical filter 13 of paper or other suitable material (see Figure 1) inserted from above through the open upper end of the bowl and preferably of such dimension as to bear at its upper edge 14 against the inner surface of the bowl somewhat below the open upper end thereof.

Below shoulder 12 vesesl 10 is reduced and extends as a tubular portion 15 of substantial length terminating at its lower end in an annular flange 16 and provided above said flange with an external knob or similar projection 17. Below shoulder 12, the tubular extension is pressed outwardly to provide an annular groove 18 which, where "vacuum" coffee is being made, functions as a seat or retainer for a coffee measuring device (see Figure 4).

Where the conical filter 13 is used, the closed end of the cone extends well down into tubular extension 15 as shown in Figure 1, and at its apex provides a centering and supporting seat for the lower end of my coffee-measuring rod 19.

Such rod may be variously constructed accordingly as whether "drip" or "vacuum" coffee is to be made in the machine. The forms of rod shown in Figures 1, 2 and 3 are particularly designed for use with the internal type of filter 13 shown in Figure 1 for making drip coffee. The forms shown in Figures 4 to 8 are particularly designed for use with the external type of filter 20 for making "vacuum" coffee.

Filter 20 consists of a disc of cloth or other suitable material having a rim 21 to be gathered over flange 16 and tightened thereon by means of a drawstring 22, the free end or ends of said string being tied around knob 17 (see Figure 4), thus converting the extension 15 into a reservoir for the charge of ground coffee.

All forms of rod 19 are characterized in that each is provided with a series of longitudinally spaced graduations 23 and at least one slidable indicator 24 or 25. The indicator or indicators may be of double bevel form as shown in Figures 1, 2 and 4, or circular in form, as shown in Figures 3 and 6, or one indicator of each design may be used, as shown in Figure 6.

In the form of rod shown in Figure 6, the uppermost marker 25 will show the height to which the coffee infusion should rise if a proper amount of ground coffee and water has been used, and also serves as a check to show whether or not any water has been lost in boiling, so that more water may be added, if necessary, to bring the level to the predetermined indicated point.

In the form of rod shown in Figures 1 and 3, the rod has fixed thereto at a suitable distance above its lower end a horizontally disposed disc 26 which contacts the inner surface of the conical filter and functions with the apex of the cone to center the rod in an upright position.

In the form of rod shown in Figure 2, I may assemble, as by means of screw threads, a conical cup-like member 27 to the lower end of the rod, which likewise assists to center the rod in an upright position. This form of rod may also be used after its use as a coffee measurer to take cream from the top of a milk bottle.

In the form of rod shown in Figures 4 and 5, which rod is especially designed for use in making "vacuum" coffee, the rod between its ends is bent to provide a substantially circular resilient retaining portion 28 to be compressed and placed within the annular groove 18 of vessel 10 and to expand and positively retain the rod in position. Beyond said retaining portion 28, rod 19 extends as an upright handle 29 by means of which the rod may be grasped and manipulated.

In the form of rods shown in Figures 6, 7 and 8, which rods likewise are especially designed for use in making "vacuum" coffee, the rods are positioned within the vessel 10 by means of a pronged resilient retaining device fixed thereon at distances such as to seat within groove 18 of vessel 10.

In the rod of Figures 6 and 7, such retaining device comprises two diametrically opposite prongs 30 with upturned, inwardly bent ends for frictional contact with the wall of the vessel 10.

In the rod of Figure 8, there are three spaced radially extending prongs 31.

In both forms, the prongs possess sufficient resiliency to enable them to retain the rod in the desired position within vessel 10.

While I have discussed my invention in connection with a coffee maker, it is obvious that the principles are applicable to other uses where a predetermined quantity of material is to be placed in a holding vessel.

Various other modifications in construction and assembly may be likewise resorted to within the spirit and scope of my invention as defined by the appended claims.

Having thus described my invention, what I claim as new and desire to secure by Letters Patent is:

1. In a coffee maker, a bowl-shaped vessel of transparent material open at its top and having a tubular portion extending downwardly from its bottom, said bowl adjacent the juncture of said tubular portion with the bottom of the bowl being formed to present an internal annular shoulder, a filter cone seated within said bowl and between its ends bearing against said shoulder and having its apex extending downwardly into said tubular portion, and a graduated measuring rod disposed in upright position within said cone with its lower end bottomed in the apex of the cone.

2. The structure of claim 1 and an indicator adjustable axially along said rod relative to the graduations thereof.

3. The structure of claim 1 and a disc on and extending transversely of the rod near its lower end for contact against the inner surface of the wall of the cone to assist in centering the rod in an upright position.

4. The structure of claim 1 and a conical coffee retaining cup on the rod near its lower end for fitting within the apex of the cone and assisting to center the rod in an upright position.

5. In a coffee maker, a bowl-shaped vessel of transparent material open at its top and having a tubular portion extending downwardly from its bottom, a conical filter element disposed within said vessel and constituting a reservoir for a charge of ground coffee, a graduated measuring rod disposed in upright position within said filter element and vessel, an indicator slidable along said rod relative to the graduations thereof, and a member on and extending transversely of the rod near its lower end for contact with the conical filter element to center the rod in an upright position.

ROLAND L. SMITH.

REFERENCES CITED

The following references are of record in the file of this patent:

UNITED STATES PATENTS

| Number | Name | Date |
|---|---|---|
| 225,755 | Keene | Mar. 23, 1880 |
| 369,838 | Buxton | Sept. 13, 1887 |
| 529,202 | Schramm | Nov. 13, 1894 |
| 1,366,656 | Haver | Jan. 25, 1921 |
| 1,635,260 | Crouse | July 12, 1927 |
| 1,870,254 | Kircher et al. | Aug. 9, 1932 |
| 1,978,074 | Bogoslowsky | Oct. 23, 1934 |
| 2,093,980 | Linger | Sept. 21, 1937 |
| 2,151,407 | Lobl | Mar. 21, 1939 |
| 2,285,930 | Kahan | June 9, 1942 |
| 2,359,936 | Peterson | Oct. 10, 1944 |

FOREIGN PATENTS

| Number | Country | Date |
|---|---|---|
| 28,385 | France | Sept. 11, 1884 |